(12) United States Patent
Bogner et al.

(10) Patent No.: US 12,479,029 B2
(45) Date of Patent: Nov. 25, 2025

(54) METHOD FOR SELECTIVELY IRRADIATING A POWDER LAYER IN ADDITIVE MANUFACTURING WITH A FIRST AND A SECOND IRRADIATION PATTERN

(71) Applicant: Siemens Energy Global GmbH & Co. KG, Bayern (DE)

(72) Inventors: Jan Pascal Bogner, Berlin (DE); Simon Purschke, Berlin (DE); Julius Schurb, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 853 days.

(21) Appl. No.: 17/775,282

(22) PCT Filed: Oct. 7, 2020

(86) PCT No.: PCT/EP2020/078083
§ 371 (c)(1),
(2) Date: May 7, 2022

(87) PCT Pub. No.: WO2021/104730
PCT Pub. Date: Jun. 3, 2021

(65) Prior Publication Data
US 2022/0388067 A1  Dec. 8, 2022

(30) Foreign Application Priority Data

Nov. 27, 2019  (DE) .................... 10 2019 218 377.8

(51) Int. Cl.
B33Y 10/00  (2015.01)
B22F 10/28  (2021.01)
(Continued)

(52) U.S. Cl.
CPC ............ B22F 10/366 (2021.01); B22F 10/28 (2021.01); B23K 15/0086 (2013.01);
(Continued)

(58) Field of Classification Search
CPC .......... B22F 10/00; B22F 10/20; B22F 10/22; B22F 10/25; B22F 10/28; B22F 10/36;
(Continued)

(56) References Cited

U.S. PATENT DOCUMENTS 8,784,720 B2  7/2014  Oberhofer
2007/0003427 A1  1/2007  Yamamoto
(Continued)

FOREIGN PATENT DOCUMENTS

DE  102010008960 A1  8/2011
DE  102016205259 A1  10/2017
(Continued)

OTHER PUBLICATIONS

Dong, Zhichao, Yabo Liu, Weibin Wen, Jingran Ge, and Jun Liang; Effect of Hatch Spacing on Melt Pool and As-built Quality During Selective Laser Melting of Stainless Steel: Modeling and Experimental Approaches; Materials 2019, 12, 50; MDPI doi:10.3390/ma12010050, www.mdpi.com/journal/materials; 2018.
(Continued)

*Primary Examiner* — Hung D Nguyen
(74) *Attorney, Agent, or Firm* — Wolter Van Dyke Davis, PLLC

(57) ABSTRACT

A method for selectively irradiating a powder layer in additive manufacturing of a component. The method including: determining an irradiation pattern of the layer for additive manufacturing, wherein a first partial pattern is defined which is intended for continuous irradiation and comprises a plurality of irradiation vectors and wherein a second partial pattern is defined, which is intended for a
(Continued)

pulsed irradiation, with the first and the second partial pattern being selected in such a manner that the second partial pattern connects irradiation vectors of the first partial pattern, and irradiating the layer in accordance with the irradiation patterns defined. A computer program product, an irradiating device, and a control unit for controlling an irradiating device are included.

8 Claims, 2 Drawing Sheets

(51) Int. Cl.
*B22F 10/366* (2021.01)
*B23K 15/00* (2006.01)
*B23K 26/0622* (2014.01)
*B23K 26/342* (2014.01)

(52) U.S. Cl.
CPC ........ *B23K 26/0622* (2015.10); *B23K 26/342* (2015.10); *B33Y 10/00* (2014.12)

(58) Field of Classification Search
CPC ........ B22F 10/366; B22F 10/85; B22F 12/40; B22F 12/43; B22F 12/45; B23K 26/062; B23K 26/0622; B23K 26/34; B23K 26/342; B23K 26/352; B23K 26/354; B23K 15/0086; B33Y 50/00; B33Y 50/02; B33Y 10/00; B33Y 80/00; B33Y 30/00; B29C 64/135; B29C 64/153; B29C 64/188; Y02P 10/25

See application file for complete search history.

(56) References Cited

U.S. PATENT DOCUMENTS

| | | |
|---|---|---|
| 2011/0221099 A1 | 9/2011 | Oberhofer et al. |
| 2012/0132627 A1 | 5/2012 | Wescott et al. |
| 2016/0236299 A1* | 8/2016 | Oberhofer ............... B22F 10/28 |
| 2016/0250715 A1 | 9/2016 | Burbaum et al. |
| 2017/0144248 A1 | 5/2017 | Yoshimura |
| 2018/0207722 A1 | 7/2018 | Feldmann |
| 2018/0290241 A1 | 10/2018 | Mcclelland |
| 2019/0047050 A1 | 2/2019 | Zhang |
| 2019/0275613 A1 | 9/2019 | Etter |
| 2020/0023466 A1* | 1/2020 | Werner ................ B29C 64/153 |
| 2020/0122272 A1* | 4/2020 | Werner ................ B22F 12/90 |
| 2021/0053119 A1 | 2/2021 | Geisen |

FOREIGN PATENT DOCUMENTS

| | | |
|---|---|---|
| DE | 102019104839 A1 | 9/2019 |
| DE | 102019208202 A1 | 12/2020 |
| EP | 2424706 A1 | 3/2012 |
| EP | 2601006 B1 | 6/2014 |
| EP | 2868422 A1 | 5/2015 |
| EP | 3542927 A1 | 9/2019 |
| JP | 2001277368 A | 10/2001 |
| WO | 2005056221 A1 | 6/2005 |
| WO | 2015151865 A1 | 10/2015 |
| WO | 2018036930 A1 | 3/2018 |
| WO | 2018223478 A1 | 12/2018 |
| WO | 2019141381 A1 | 7/2019 |

OTHER PUBLICATIONS

PCT International Search Report and Written Opinion of International Searching Authority mailed Nov. 27, 2020 corresponding to PCT International Application No. PCT/EP2020/078083 filed Oct. 7, 2020.

Zhou Cong et al., Experimental Study on Picosecond Pulse Laser Cleaning of Aluminum Alloy, Applied Laser, Bd. 38, Nr. 02; 2018, 256-262 [English abstract on p. 1].

* cited by examiner

METHOD FOR SELECTIVELY IRRADIATING A POWDER LAYER IN ADDITIVE MANUFACTURING WITH A FIRST AND A SECOND IRRADIATION PATTERN

CROSS REFERENCE TO RELATED APPLICATIONS

This application is the US National Stage of International Application No. PCT/EP2020/078083 filed 7 Oct. 2020, and claims the benefit thereof. The International Application claims the benefit of German Application No. DE 10 2019 218 377.8 filed 27 Nov. 2019. All of the applications are incorporated by reference herein in their entirety.

FIELD OF INVENTION

The present invention relates to a method for selectively irradiating a powder layer in the additive production of a component, and to a corresponding production method, wherein a particular two-part irradiation pattern is defined. A corresponding computer program product, an apparatus having an irradiation device, and a controller for driving the irradiation device are furthermore specified.

The component is advantageously intended for use in a turbomachine, advantageously in the hot-gas path of a gas turbine. The component therefore advantageously consists of a superalloy, in particular a nickel- or cobalt-based superalloy. The alloy may be precipitation-hardened or precipitation-hardenable.

Alternatively, the component may be any other component, advantageously thermally and/or mechanically highly load-bearing, for example a component which is used in the automobile or aviation sector.

BACKGROUND OF INVENTION

Such constituent parts, and in particular gas turbines, are the subject of constant development in order to increase their efficiency. This, however, leads to ever-higher temperatures to which corresponding components in the hot-gas path are exposed and must withstand. The metallic materials for rotor blades, particularly in the first stages, are, amongst other things, constantly being improved in respect of their durability at high temperatures, creep strength and resistance to thermomechanical fatigue.

Generative or additive manufacturing is gaining increasing interest because of its disruptive potential for industry, including for series production of the aforementioned turbine constituent parts, for example turbine blades or burner constituent parts.

Additive production (additive manufacturing, AM) methods comprise for example, as powder bed methods, selective laser melting (SLM) or laser sintering (SLS), or electron-beam melting (EBM). Further additive methods are for example directed energy deposition (DED) methods, in particular laser deposition welding, electron-beam or plasma powder welding, wire welding, metallic powder injection-molding, so-called sheet lamination methods, or thermal spraying methods (VPS LPPS, GDCS). AM methods have furthermore proven particularly advantageous for complex or intricately configured components, for example labyrinth-like structures, cooling structures and/or lightweight structures. In particular, additive manufacturing is advantageous because of a particularly short chain of process steps, since a production or manufacturing step of a component may be carried out substantially on the basis of a corresponding CAD file and the selection of corresponding manufacturing parameters.

A method for selective laser melting is known, for example, from EP 2 601 006 B1.

Furthermore, studies into irradiation parameters such as a hatch spacing, and their effect on a melt pool and structural quality of the component produced during selective laser melting, are described in "Effect of Hatch Spacing on Melt Pool and As-built Quality During Selective Laser Melting of Stainless Steel: Modeling and Experimental Approaches", Zhichao Dong, Yabo Liu, Weibin Wen, Jingran Ge and Jun Liang.

One problem which is often associated with additive production of the aforementioned constituent parts is that the complicated melting and solidification conditions of the energy of a locally introduced laser beam or electron beam in a powder bed, and the reaction kinetics connected therewith, lead to a high internal stress or crack susceptibility of the structure directly obtained. These problems and aspects furthermore depend strongly on the component geometry and the selected irradiation parameters, which even makes reproducibility of the production process overall difficult, particularly in view of a multiplicity of layers to be irradiated (often several tens of thousands) and correspondingly even more irradiation vectors.

In particular, materials which are especially hard and/or strong are furthermore particularly susceptible to heat cracks or solidification cracks. At the same time, such components are often complexly shaped and also producible only very complicatedly and expensively by conventional means, so that they are nevertheless very suitable for additive manufacturing.

The optimization of stress states of components produced additively from the powder bed is the subject of extensive research and development. To this end, in particular, the irradiation conditions or process parameters, such as an irradiation rate, laser power or power density, or processing of the materials at high temperatures are being studied with a view to improved weldability and deformability and in-situ stress reduction. A reduction of the internal stress of the additive construction may also be achieved by means of optimizing the irradiation strategy or irradiation pattern.

SUMMARY OF INVENTION

It is therefore an object of the present invention to provide means with which the aforementioned problems can be solved or reduced, or the corresponding disadvantages can be overcome. In particular, the present invention is intended to provide an improved irradiation strategy or an improved two-part irradiation pattern, comprising a first partial pattern and a second partial pattern.

This object is achieved by the subject matter of the independent patent claims. The dependent patent claims relate to advantageous configurations.

One aspect of the present invention relates to a method for selectively irradiating a powder layer in the, particularly powder bed-based, additive production of a component, or to a corresponding method for selectively producing the latter. The additive production of the component is in particular provided by beam melting methods such as SLS, SLM or EBM, of the type mentioned in the introduction.

The method comprises the definition of an irradiation pattern of the layer, or a scan strategy for the corresponding regions of the layer which are to be irradiated, for the additive production, wherein a first partial pattern of or for the irradiation pattern is defined. The first partial pattern is intended for continuous irradiation, in particular with a laser or an electron beam, and comprises a multiplicity of irradiation vectors. Furthermore, a second partial pattern, different to the first partial pattern, of or for the irradiation pattern, which is intended for pulsed irradiation, in particular with a laser beam or electron beam, is defined.

The first partial pattern and the second partial pattern are selected in such a way that the second partial pattern connects irradiation vectors, advantageously all or substantially all irradiation vectors, or corresponding beam melting tracks, of the first partial pattern.

The method furthermore comprises irradiation of the layer according to the defined irradiation pattern comprising the first and the second partial pattern.

Owing to the fact that the irradiation vectors, or the corresponding beam melting tracks, of the first partial pattern are connected by the second partial pattern to be irradiated with pulses, the internal stress state of the additively achieved structure may also be reduced considerably because of the energy input which is decreased in pulse operation, and weldability of materials which hitherto cannot or can scarcely be welded may thus possibly be achieved.

In one configuration, the irradiation of the layer leads to regions of the layer which are or have been irradiated continuously being connected structurally, geometrically stably and/or with a material bond by regions of the layer which are or have been irradiated with pulses.

In one configuration, the irradiation vectors are substantially parallel to one another.

In one configuration, the irradiation vectors do not overlap one another, or do so only minimally.

In one configuration, beam melting tracks of, in particular directly, neighboring regions of the layer which are irradiated continuously do not overlap in a plan view of the layer. The effect achieved by this configuration is, in particular, that the stress state of those solidified regions which are irradiated in the continuous mode—over the entire layer—is kept particularly low and crack susceptibility is therefore also reduced greatly.

In one configuration, beam melting tracks of, in particular directly, neighboring regions of the layer which are irradiated continuously overlap by less than 60 μm in a plan view of the layer.

In one configuration, beam melting tracks of, in particular directly, neighboring regions of the layer which are irradiated continuously overlap by less than 40 μm in a plan view of the layer.

In one configuration, a beam melting track of regions or of a region of the layer which are/is irradiated with pulses respectively overlaps in a plan view of the layer with beam melting tracks of neighboring regions of the layer which are irradiated continuously.

In one configuration, two neighboring irradiation vectors of the first partial pattern are initially irradiated continuously—and advantageously without or with only minimal overlap—and a further neighboring irradiation vector of the first partial pattern is subsequently irradiated simultaneously with a region of the second partial pattern, which connects the regions of the irradiation vectors of the first partial pattern. By this configuration, the process efficiency may in particular be improved.

In one configuration, another further neighboring irradiation vector of the first partial pattern is irradiated simultaneously with a further region of the second partial pattern, which connects a region of an irradiation vector of the first partial pattern and a region of the further neighboring irradiation vector of the first partial pattern. By this configuration, the process efficiency may likewise be improved.

A further aspect of the present invention relates to a computer program or computer program product comprising instructions which, when a corresponding program is run by a computer or a data processing device, cause the latter to define the irradiation pattern comprising the first and the second partial pattern. A geometry of the component to be additively produced may therefore advantageously be specified by a CAD file.

The computer program product may furthermore carry out a CAM (computer-aided manufacturing) method or parts thereof.

A computer program product, for example a computer program means, may for example be provided or contained as a (volatile or nonvolatile) storage medium, for example a memory card, a USB stick, a CD-ROM or DVD, or alternatively in the form of a file downloadable from a server and/or in a network. The provision may furthermore be carried out, for example, in a wireless communication network by transmitting a corresponding file comprising the computer program product or the computer program means. A computer program product may contain program code, machine code, G-code and/or executable program instructions in general.

A further aspect of the present invention relates to an apparatus comprising at least one irradiation device, for example as part of a production installation for powder bed-based additive production methods, which is adapted to irradiate the layer according to the defined irradiation pattern. Expediently, the irradiation device is therefore configured for continuous as well as for pulsed irradiation operation, for example by means of a laser or an electron beam.

A further aspect of the present invention relates to a controller which is adapted to drive an irradiation device for selectively irradiating a powder layer—as described.

Configurations, features and/or advantages which relate here to the method or the computer program product may furthermore apply to the apparatus or the controller, or vice versa.

Further features, properties and advantages of the present invention will be described in more detail below with the aid of exemplary embodiments with reference to the appended figures. All the features described above and below are in this case advantageous both individually and in combination with one another. It is to be understood that other embodiments may be used and structural or logical modifications may be carried out, without departing from the protective scope of the present invention. The following description is therefore not to be interpreted in a restrictive sense.

When it is used in a series of two or more elements, the expression "and/or" used here means that each of the elements mentioned may be used individually, or any combination of two or more of the embodiments mentioned may be used.

DETAILED DESCRIPTION OF INVENTION

In the exemplary embodiments and figures, elements which are the same or have the same effect may respectively be provided with the same references. The elements represented and their size proportions with respect to one another are not in principle to be regarded as true to scale, and individual elements may instead be represented as being exaggeratedly thick or large for improved representability and/or for improved understanding.

Figure 1:
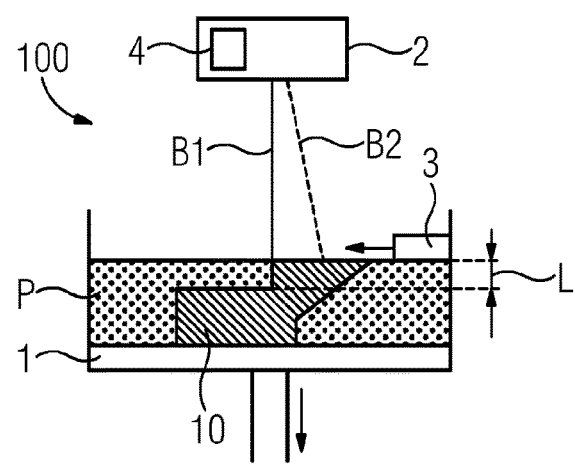
FIG. 1 indicates a powder bed-based additive production method of a component with the aid of a schematic sectional view.

FIG. 1 shows a schematic sectional view of an additive production installation 100, or a part thereof. The installation is advantageously configured for the additive construction of a component 10 by selective laser sintering, selective laser melting or electron-beam melting.

Accordingly, the installation comprises a lowerable construction platform 1. A starting material P, advantageously in powder form, is arranged on the construction platform, advantageously by means of a coating device 3. This is done layer-by-layer after each layer L has been selectively exposed according to the desired component geometry by an energy beam, for example a laser or an electron beam. To this end, an irradiation device 2 is provided, which is correspondingly adapted expediently to irradiate the layer L by continuous irradiation operation B1 and by pulsed irradiation operation B2 (indicated by dashes).

The irradiation device 2 furthermore advantageously comprises a controller for driving the irradiation device 2, which according to the invention is correspondingly adapted to irradiate a layer according to the irradiation pattern presented below. As an alternative, the irradiation device 2 may be interconnected with the controller and/or coupled thereto.

Figure 2:
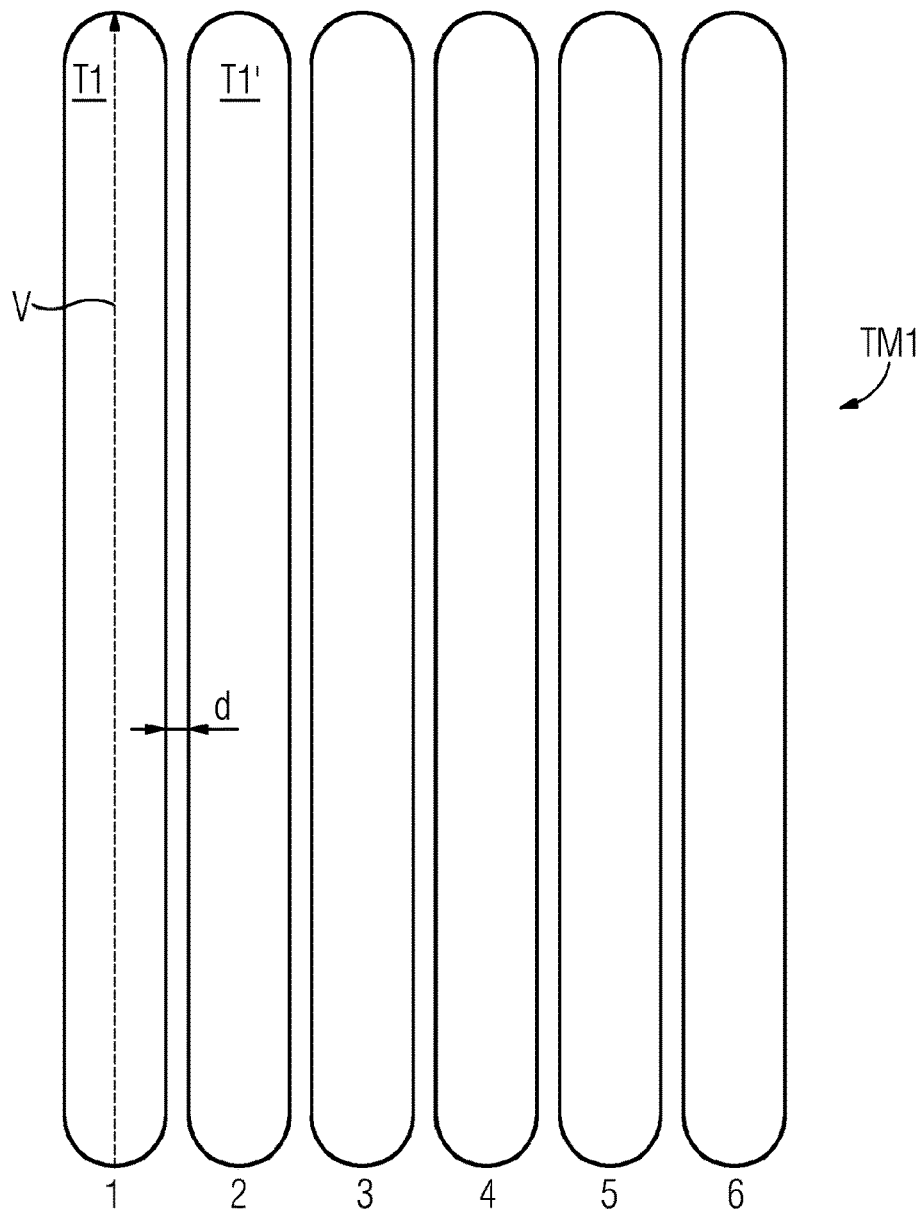
FIG. 2 indicates an irradiation pattern, which is intended for continuous irradiation operation, with the aid of a schematic plan view of a layer.

FIG. 2 shows a simplified schematic plan view of a first irradiation pattern or partial pattern TM1 of or for a layer, in particular a powder layer, such as is successively provided for production of the component 10 (compare FIG. 1). The first partial pattern TM1 is intended for continuous irradiation of the layer, for example by means of a laser in continuous wave operation or quasi-continuous wave operation, or a comparable electron beam. The first partial pattern TM1 furthermore comprises a multiplicity of elongate regions or irradiation vectors V.

During the subsequent irradiation of a region denoted by the irradiation vectors V, beam melting tracks T1 (or beam welding seams), in which the powder P is locally melted and then solidified, are left behind by the (selective) heat input in this region. In the present case—for the sake of simplicity—a multiplicity of parallel irradiation vectors can be seen. The irradiation vectors V furthermore do not overlap with one another in the plan view shown. By the spacing d denoted, it may be seen that there is no overlap of the corresponding regions here.

Parallel to a beam melting track T1, FIG. 2 shows (to its right) a second beam melting track T1' of a second irradiation vector V (not explicitly denoted).

In an alternative configuration according to the invention, the described irradiation vectors V of the first partial pattern TM1 overlap only very weakly or minimally in a plan view of the layer, for example by less than 75 µm, advantageously less than 60 µm, less than 50 µm, or even less, for instance less than 40 µm or less than 30 µm. By this configuration, the stress state of the freshly solidified regions or the structure of the beam melting tracks is also advantageously kept low.

In contrast thereto, in conventional irradiation strategies in powder bed-based additive production, corresponding irradiation vectors such as hatch vectors, which are selected for the extensive irradiation of a powder layer, are provided with an overlap in order to generate a structure which is dense and solid but, because of the high temperature gradients involved and the large spatial overlap of the welding tracks obtained, is highly stressed and/or susceptible to cracks.

For a sufficient structural, geometrically stable and/or materially bonded connection of component material to be irradiated of each layer L, according to the invention a second irradiation pattern or partial pattern TM2 of the layer L is advantageously selected or defined (compare also FIG. 4 below).

Figure 3:
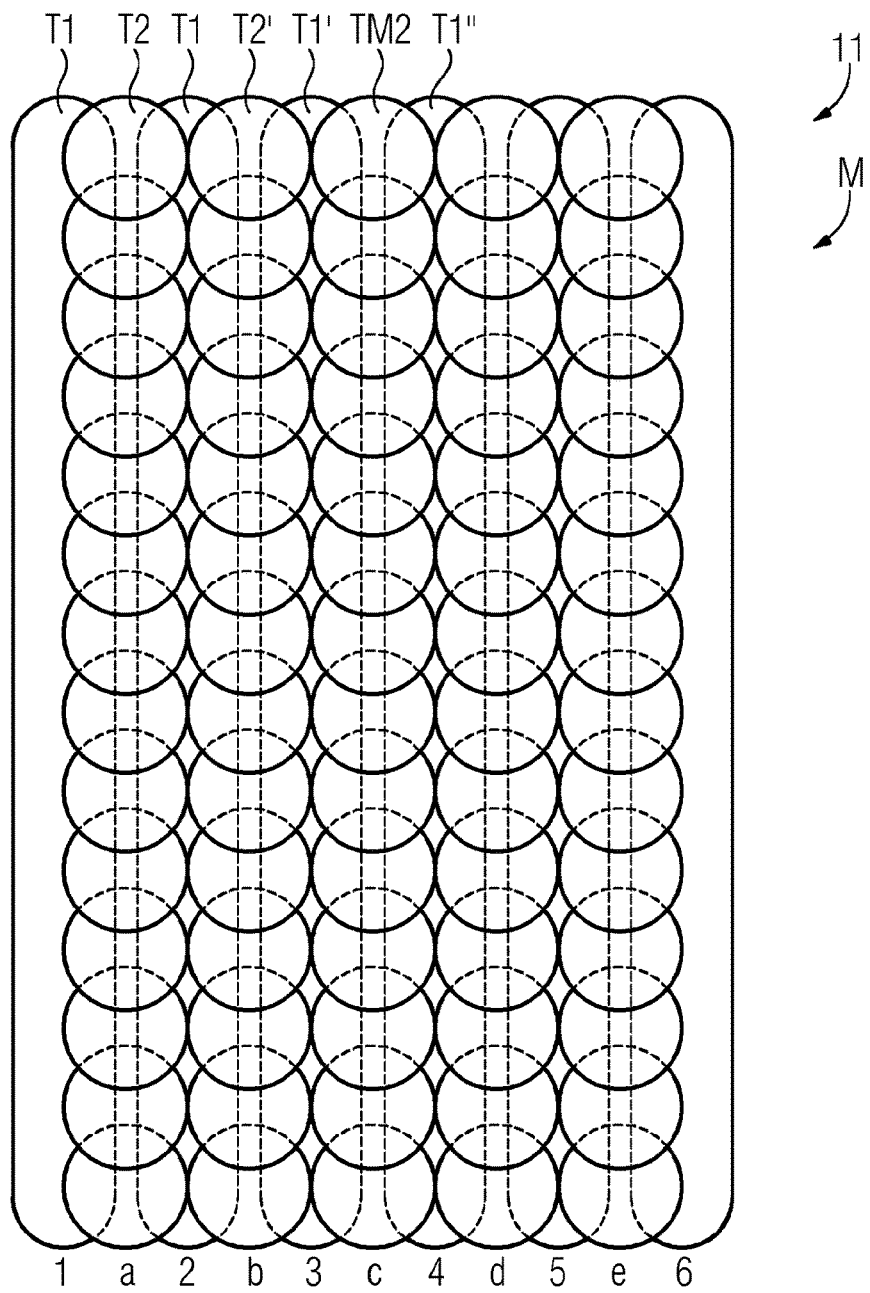
FIG. 3 indicates an irradiation pattern according to the invention, comprising a first partial pattern and a second partial pattern, with the aid of a schematic plan view of the layer.

This aforementioned second partial pattern TM2 is schematically indicated in addition to the first partial pattern TM1 in FIG. 3. Overall, a total irradiation pattern is denoted by the reference M.

In contrast to the first partial pattern TM1, the second partial pattern TM2 is furthermore intended for pulsed irradiation operation, for example by means of a Q-switched or mode-coupled laser.

The second partial pattern TM2 is selected, configured or arranged according to the invention in such a way that the second partial pattern connects irradiation vectors V or corresponding beam melting tracks of the first partial pattern TM1. This is represented in FIG. 3 by individual, roundly indicated regions for the pulsed irradiation respectively overlapping with two or more neighboring regions of the first partial pattern, in order to allow sufficient structural coherence of the corresponding layer. Overall, for each layer to be (selectively) irradiated of the component—in total there may be thousands or even tens of thousands of layers—a solid and dense material structure is thus obtained.

The pulsed operation of a laser is distinguished, for example in contrast to a conventional continuous irradiation mode, by a lower temporal or spatial energy input and therefore correspondingly by a reduced thermal load. Advantageously, this automatically in turn significantly reduces the stresses which occur during construction as well as during subsequent processing steps and in operation of the component, and therefore the crack susceptibility of the latter. Although pulsed irradiation operation is significantly more time-consuming or procedurally inefficient than continuous irradiation, the combination of the aforementioned defined or selected irradiation patterns TM1 and TM2 nevertheless allows the low internal stress state of the structure achieved to be obtained by time-efficient production.

In particular, according to the method according to the invention, described below with the aid of FIG. 4, for additive production, a first and a second melting track of the first partial pattern TM1 are initially irradiated (next to one another). These parallel regions are denoted in FIG. 3 by the numbers 1 and 2 in the lower region. In a next step, a further neighboring irradiation vector T1' of the first partial pattern TM1 is advantageously irradiated simultaneously with a region T2 of the second partial pattern TM2, the region T2 connecting the irradiated regions T1 of the irradiation vectors of the first partial pattern. This corresponds to simultaneous irradiation of the "pulsed" region a and the "continuous" region 3 in FIG. 3.

Furthermore, in a next step, another further neighboring irradiation vector T1" of the first partial pattern is advantageously irradiated simultaneously with a further region T2' of the second partial pattern TM2, which connects a region T1 of the irradiation vector of the first partial pattern and a region T1' of the further neighboring irradiation vector of the first partial pattern TM1. This corresponds to simultaneous irradiation of the pulsed regions b and the continuous region 4 in FIG. 3.

The irradiation of an entire predetermined layer L for the component 10—and furthermore of each further layer for the component—may be carried out accordingly. In particular, as illustrated with the aid of FIG. 3, according to the invention the pulsed region c is then irradiated simultaneously with the region 5 to be irradiated continuously and, inter alia, the pulsed region d is irradiated simultaneously with the region 6 to be irradiated continuously.

Figure 4:
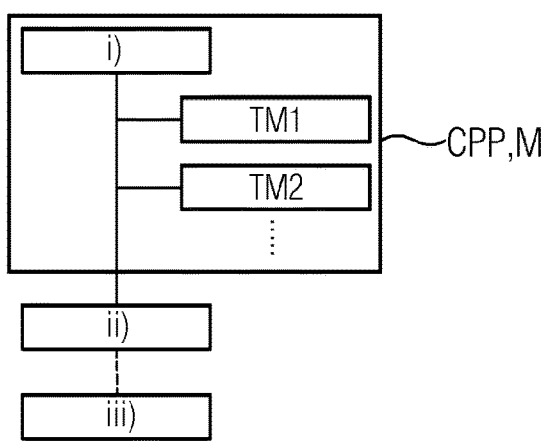
FIG. 4 indicates method steps according to the invention with the aid of a schematic flowchart.

FIG. 4 indicates method steps according to the invention of the proposed method for selectively irradiating a powder layer for additive production of the component 10 with the aid of the schematically shown flowchart.

Method step (i) denotes the definition of the entire irradiation pattern M of the layer L for the additive production. The irradiation pattern M comprises the above-described first partial pattern TM1 and the above-described second partial pattern TM2. As described above, the partial patterns TM1 and TM2 are advantageously also defined and/or specified according to the invention, for example in the scope of a CAM method.

The reference CPP is intended to indicate that the definition of the irradiation pattern M may be also carried out according to the invention with computer implementation and/or by a computer program or computer program product. The computer program or computer program product may comprise corresponding instructions or data which, when the program is run, cause a data processing device or a computer to define the irradiation pattern in a corresponding manner according to the invention. Information or data which make it possible to execute the irradiation pattern as proposed according to the invention may accordingly also be present accessibly as stored data.

Method step (ii) lastly indicates the irradiation of the layer L according to the defined irradiation pattern, so that the component can actually be constructed layer-by-layer.

Optional method step (iii) is intended to indicate that, for the final production of the component 10, a multiplicity of further layers need to be selectively irradiated and solidified, and that optional finishing steps of mechanical or thermal nature may possibly be necessary or helpful.

The component 10 which may be provided with the aid of the irradiation pattern M proposed according to the invention, comprising the first partial pattern TM1 and the second partial pattern TM2, with significantly improved structural properties, i.e. particularly a lower stress state, is advantageously a component which is used in the hot-gas path of a turbomachine, for example a gas turbine. In particular, the component may refer to a rotor blade or guide vane, a ring segment, a burner part or a burner tip, a shroud, a screen, a heat shield, a nozzle, a seal, a filter, an orifice or lance, a resonator, a piston or a swirler, or a corresponding transition, insert, or a corresponding retrofit part.

By the description with the aid of the exemplary embodiments, the invention is not restricted thereto but comprises any new feature and any combination of features. In particular, this includes any combination of features in the patent claims, even if this feature or this combination itself is not explicitly specified in the patent claims or the exemplary embodiments.

The invention claimed is:

1. A method for selectively irradiating a powder layer in the additive production of a component, comprising:
    defining an irradiation pattern of the layer for the additive production, wherein a first partial pattern which is intended for continuous irradiation and comprises a multiplicity of irradiation vectors is defined, and wherein a second partial pattern which is intended for pulsed irradiation is defined, the first and the second partial patterns being selected in such a way that the second partial pattern connects irradiation vectors of the first partial pattern, and
    irradiating the layer according to the defined irradiation pattern, wherein a beam melting track of regions of the layer which are irradiated with pulses respectively overlaps in a plan view of the layer with beam melting tracks of neighboring regions of the layer which are irradiated continuously, and wherein beam melting tracks of neighboring regions of the layer which are irradiated continuously do not overlap in a plan view of the layer.

2. The method as claimed in claim 1,
    wherein the irradiation of the layer leads to regions of the layer which are irradiated continuously being connected structurally by regions of the layer which are irradiated with pulses.

3. The method as claimed in claim 1,
    wherein beam melting tracks of neighboring regions of the layer which are irradiated continuously overlap by less than 60 µm in a plan view of the layer.

4. The method as claimed in claim 1,
    wherein two neighboring irradiation vectors of the first partial pattern are initially irradiated continuously and a further neighboring irradiation vector of the first partial pattern is subsequently irradiated simultaneously with a region of the second partial pattern, which connects the regions of the irradiation vectors of the first partial pattern.

5. The method as claimed in claim 4,
    wherein another further neighboring irradiation vector of the first partial pattern is irradiated simultaneously with a further region of the second partial pattern, which connects a region of an irradiation vector of the first partial pattern and a region of the further neighboring irradiation vector of the first partial pattern.

6. A non-transitory computer readable medium, comprising:
    computer instructions stored thereon which, when run by a computer, cause the computer to define the irradiation pattern as claimed in claim 1.

7. An apparatus, comprising:
    at least one irradiation device which is adapted to irradiate the layer according to the defined irradiation pattern as claimed in claim 1.

8. A controller
    which is adapted to drive an irradiation device for selectively irradiating a powder layer according to the irradiation pattern defined in claim 1.

* * * * *